United States Patent [19]

Inaba et al.

[11] Patent Number: 4,482,289
[45] Date of Patent: Nov. 13, 1984

[54] ROBOT HAND OF AN INDUSTRIAL ROBOT

[75] Inventors: Hajimu Inaba, Hino; Shinsuke Sakakibara, Kunitachi; Ryo Nihei, Musashino, all of Japan

[73] Assignee: Fujitsu Fanuc Limited, Hino, Japan

[21] Appl. No.: 299,585

[22] Filed: Sep. 4, 1981

[30] Foreign Application Priority Data

Sep. 11, 1980 [JP] Japan .................. 55-125247

[51] Int. Cl.³ .................................... B25J 15/00
[52] U.S. Cl. ........................ 414/736; 294/81 R; 901/39; 414/751
[58] Field of Search ........... 294/81 R, 86 R, 106, 294/103; 414/736, 751–753, 729, 623, 22, 23, 729, 744 A; 901/39, 16

[56] References Cited

U.S. PATENT DOCUMENTS

| 3,280,920 | 10/1966 | Scott | 414/22 X |
| 3,610,673 | 10/1971 | Strombeck et al. | 294/81 R X |
| 3,774,778 | 11/1973 | Flaig | 414/751 X |
| 4,042,122 | 8/1977 | Espy et al. | 414/751 X |
| 4,240,660 | 12/1980 | Roth et al. | 294/81 R |

Primary Examiner—Robert J. Spar
Assistant Examiner—Terrance L. Siemens
Attorney, Agent, or Firm—Armstrong, Nikaido, Marmelstein & Kubovcik

[57] ABSTRACT

A robot hand of an industrial robot used as a manipulating device of a bar-like workpiece having a pair of gripping members attached to a base member and arranged so as to be slid toward and away from one another so that an appropriate distance between the pair of gripping members is established depending on the difference of lengths of workpieces to be gripped by the gripping members of the robot hand.

7 Claims, 5 Drawing Figures

ROBOT HAND OF AN INDUSTRIAL ROBOT

FIELD OF THE INVENTION

The present invention relates generally to an industrial robot, and more particularly relates to an improvement in the structure and function of a robot hand of an industrial robot.

Generally, the industrial robot is employed as an industrial manipulating device adapted for a machine, for example, a numerically controlled machine tool for the purpose of transferring a workpiece to and from the machine tool or of attaching the workpiece to and detaching the workpiece from the machine tool. Therefore, the industrial robot is provided with a robot hand having a gripper or grippers to grip a workpiece. In the case where the conventional industrial robot is employed for transferring a workpiece in the shape of a cylindrical bar, a robot hand having two grippers is used, in which each of the two grippers can be pneumatically operated so as to grip the two spaced apart positions of the bar-like workpiece in two spaced-apart positions and to release the workpiece. The conventional two grippers are arranged so as to be permanently spaced apart from one another in the direction of the longitudinal axis of the bar-like workpiece. That is to say, the two grippers are unable to be moved toward and away from one another. This axially immovable arrangement of the two grippers is quite appropriate for dealing with many bar-like workpieces having an approximately equal length. However, if many bar-like workpieces having diverse long and short lengths have to be dealt with, the above-mentioned axially immovable arrangement of the two grippers is inappropriate, since it is impossible to adjust the distance of the two grippers in response to the difference in the lengths of workpieces to be gripped. That is to say, the axially immovable arrangement of the two grippers of the conventional robot hand of an industrial robot is unable to achieve a stable gripping of workpieces having diverse lengths.

SUMMARY OF THE INVENTION

An object of the present invention is to provide a robot hand for an industrial robot, which hand has two grippers having an arrangement in which the distance of the two grippers is adjustable in response to the difference in the lengths of bar-like workpieces to be gripped, whereby a stable gripping of bar-like workpieces is always ensured independent of the difference of the lengths of the workpieces.

In accordance with the present invention, there is provided a robot hand attached to a free end of a robot arm of an industrial robot for manipulating bar-like workpieces, comprising a base member capable of being attached to the free end of the robot arm, a pair of gripping members slidably attached to the base member, each of the gripping members having fingers for gripping a bar-like workpiece and for releasing the same, means for sliding said pair of gripping members toward and away from one another thereby establishing an adjusted distance between the pair of gripping members, and means for fixing the pair of gripping members to the base member.

DESCRIPTION OF A PREFERRED EMBODIMENT

Figure 1:
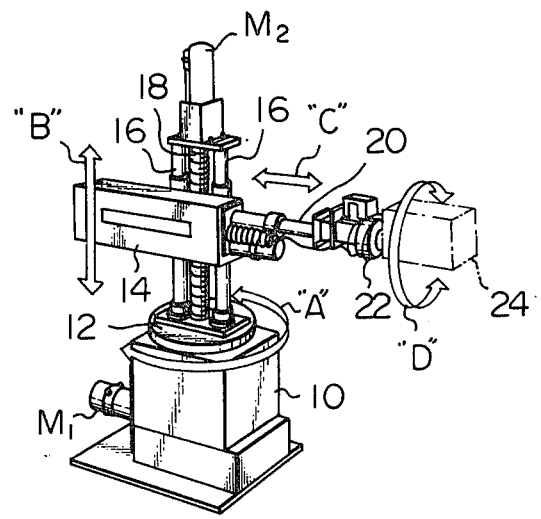
FIG. 1 is a perspective view of an industrial robot, illustrating a general structure and arrangement of the robot.

Referring to FIG. 1, the industrial robot has a stationary base 10 on which a rotary table 12 is mounted so as to be rotated by a drive motor $M_1$ in the direction shown by an arrow "A". On the rotary table 12, is mounted a vertical feed mechanism comprised of a pair of vertical guide rods 16, a vertical feed screw 18, and a drive motor $M_2$. The vertical feed mechanism moves a robot body 14 in the vertical direction shown by an arrow "B". A robot arm 20 laterally extending from the robot body 14 is capable of telescopic extension and retraction in the direction shown by an arrow "C" by the actuation of a drive means provided in the robot body 14. The robot arm 20 has a free end to which a robot wrist 22 is attached. A robot hand 24 is attached to the robot wrist 22 so that the hand 24 is rotatable in the direction shown by an arrow "D". Thus, when the robot hand 24 grips an object to be gripped, such as a workpiece, the industrial robot can transfer the object from one place to a different desired place. The robot hand 24 per se has a specified structure and an actuating mechanism which are designed so as to be appropriate for the shape and the dimensions of the object to be gripped.

Figure 2:
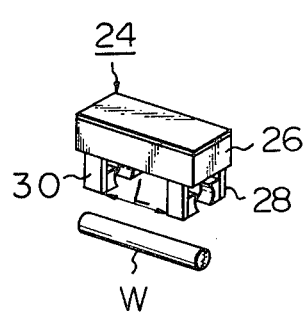
FIG. 2 is a perspective view of a conventional hand of an industrial robot, which hand is used for gripping a bar-like workpiece.

FIG. 2 illustrates the structure of a conventional robot hand 24 for gripping a workiece W in the shape of a bar. The conventional robot hand 24 has a hand base 26 to which are attached two grippers 28 and 30 capable of operating so as to grip the workpiece W and to release the same. However, the two grippers are arranged to be spaced apart from one another by a fixed distance "L". That is to say, the two grippers 28 and 30 are unable to be moved toward and away from one another. The fixed distance "L" between the two grippers 28 and 30 is chosen so as to be appropriate for stable gripping of a workpiece W having predetermined diameter and length. Therefore, the conventional robot hand 24 involves an inconvenience in that it is unable to achieve stable gripping of a workpiece having a diameter and a length different from the predetermined diameter and length.

A robot hand of an industrial robot made in accordance with the present invention can eliminate the above-mentioned inconvenience encountered by the conventional robot hand 24. The structure, arrangement and operation of the robot hand of the present invention wll now be described with reference to FIGS. 3 and 4.

Figure 3:
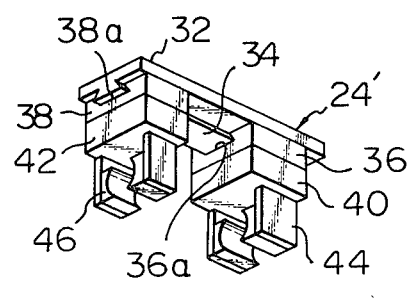
FIG. 3 is a perspective view of a robot hand of an industrial robot, according to the present invention.

In FIG. 3, a robot hand 24' embodying the present invention is comprised of a base member formed as a slide guide 32 having a straightly extending dovetail-like guide rail 34, two sliders 36 and 38 slidably engaged with the guide rail 34, and two grippers 40 and 42 fixed to the sliders 36 and 38, respectively. The guide rail 34 is formed in the center of the slide guide 32 and has a predetermined length. The two sliders 36 and 38 respectively have dovetail grooves 36a and 38a which can complementarily fit to the dovetail-like guide rail 34. The grippers 40 and 42 may be formed as one part with the corresponding sliders 36 and 38 as required. It will be understood that the grippers 40 and 42 can be manually slid toward and away from one another along the slide guide 32 due to the dovetail fitting of the two grippers 40 and 42 and the guide rail 34. Therefore, it should be understood that an appropriate distance between the two grippers 40 and 42 can be adjusted and established by manually sliding the two grippers. At this stage, it should also be understood that the two grippers 40 and 42 have fingers 44 and 46, respectively, which are pneumatically operated so as to perform gripping and releasing of a bar-like workpiece in the same manner as the fingers of the conventional grippers 28 and 30 illustrated in FIG. 2. The fingers 44 and 46 are arranged so as to be in alignment with one another.

Figure 4:
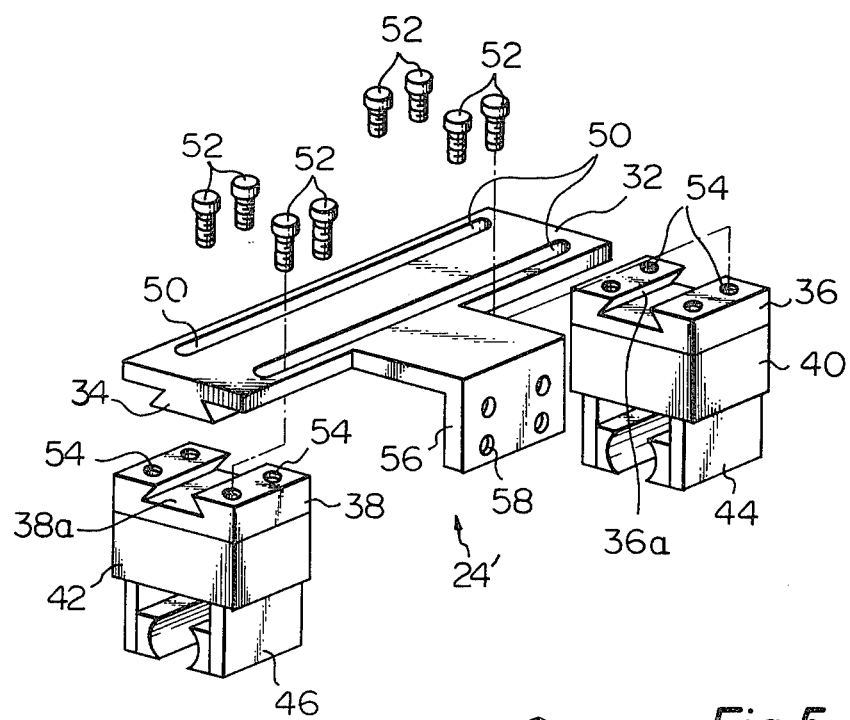
FIG. 4 is an enlarged expanded view of the hand shown in FIG. 3.

Referring now to FIG. 4, the slide guide 32 is formed with the two lengthwise grooves 50, 50 on both sides of the dovetail like guide rail 34. On the other hand, each of the two sliders 36 and 38 is formed with threaded holes 54 on both sides of the corresponding dovetail groove 36a or 38a. Therefore, after the establishment of the appropriate distance between the two grippers 40 and 42, each of the two grippers 40 and 42 can be fixed to the slide guide 32 by the use of screws 52 which are threadedly engaged into the threaded holes 54 of the two sliders 36 and 38 through the grooves 50, 50 of the slide guide 32. Further, the slide guide 32 is integrally formed with an L-shaped flange 56 having an appropriate number of through-holes 58. This flange 56 is used for attaching the robot hand 24' to the robot wrist 22 (FIG. 1) of an industrial robot by the employment of appropriate fixing means, such as screws or dowels.

With the above-described robot hand 24', the distance between the two grippers 40 and 42 is changed and adjusted depending on the difference of the lengths of workpieces to be gripped. For example, in the case where the industrial robot with the robot hand 24' should deal with rather long workpieces, the two grippers 40 and 42 are sufficiently spaced apart from one another so that a long distance between the two grippers is acquired. As a result, stable gripping of the long workpieces is ensured. On the other hand, in the case where the industrial robot with the robot hand 24' has to deal with short workpieces, the distance between the two grippers 40 and 42 is reduced so that the fingers 44 and 46 of the two grippers 40 and 42 grip the short workpieces with certainty.

In the case of the grippers 40 and 42 illustrated in FIGS. 3 and 4, the distance between these grippers is manually changed depending on a change in the lengths of workpieces. However, if required, any appropriate pneumatic or hydraulic means for actuating the sliding movement of the two grippers 40 and 42 may be arranged in the robot hand 24' so that the adjustment of the distance between the two grippers 40 and 42 is much easier. At this stage, it should be appreciated that the employment of the dovetail fitting of the two sliders 36 and 38 and the guide rail 34 of the slide guide 32 can prevent occurrence of misalignment of the centers of the two grippers 40 and 42, since no appreciable clearance is left between the dovetail-like guide rail 34 of the slide guide 32 and the dovetail grooves 36a and 38a of the two sliders 36 and 38. This fact can also contribute to the stable gripping of round rod like workpieces.

The fixing of the two grippers 40 and 42 to the slide guide 32 may be achieved by any appropriate means other than the employment of the two lengthwise grooves 50, 50 of the slide guide 32, the threaded holes 54 of the two sliders 36 and 38, and the screws 52. For example, if preferable, such fixing of the two grippers 40 and 42 to the slide guide 32 may be achieved by employing a method in which an appropriate squeeze plate is adopted for rigidly sandwiching the slide guide 32 between the squeeze plate and the two sliders 36 and 38 of the two grippers 40 and 42.

Figure 5:
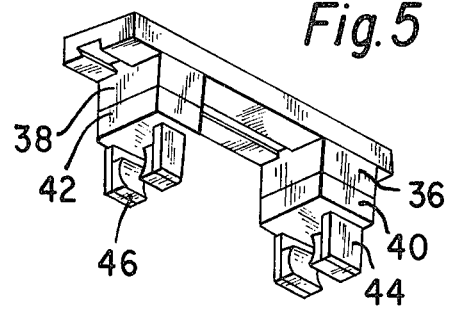
FIG. 5 shows an alternate arrangement.

Further, in the case of the robot hand 24' illustrated in FIGS. 3 and 4, the slide guide 32 is formed with a dovetail-like guide rail 34 fitting into the dovetail grooves 36a and 38a of the two sliders 36 and 38. However, alternately, the two sliders 36 and 38 may have dovetail-like guide rails, respectively which fit in a dovetail groove formed in the slide guide 32 as shown in FIG. 5.

From the foregoing description of the embodiment of the present invention, it will be understood that the robot hand of an industrial robot according to the present invention can achieve a stable gripping of workpieces irrespective of the difference in the lengths of the workpieces.

We claim:

1. A robot hand adapted for being attached to a free end of a robot arm of an industrial robot for manipulating longitudinally elongated bar-like work pieces comprising:
    a base member having a flange portion for attaching said base member to said free end of said robot arm;
    a pair of gripping members slidably attached to said base member for longitudinal movement thereon, each gripping member having transversely movable fingers enabling it to grip a bar-like work piece and to release the same;
    manually operated means for sliding said pair of gripping members toward and away from one another in the longitudinal direction of the workpiece thereby establishing an adjusted distance between said pair of gripping members;
    means for fixing said pair of gripping members to said base member at said adjusted distance; and
    said flange portion being formed with a planar attaching surface which is perpendicular to the gripping movement of said gripping members.

2. A robot hand as set forth in claim 1, wherein said sliding means comprise a straight guide rail formed in a portion of said base member, said straight guide rail having a predetermined length, and a complementary guide groove formed in a portion of each said gripping member.

3. A robot hand as set forth in claim 1, wherein said sliding means comprise a straight guide groove formed in a portion of said base member, said straight guide groove having a predetermined length, and a complementary guide rail formed in a portion of each said gripping member and capable of fitting into said guide groove of said base member.

4. A robot hand as set forth in claim 2 or 3, wherein said guide rail and said guide groove of said sliding means are formed as a dovetail fitting structure.

5. A robot hand as set forth in claim 1, wherein said fixing means comprise threaded engagement means for providing a threaded engagement between said base member and each said gripping member.

6. In an industrial robot including a stationary robot base, a rotary table rotatably mounted on said robot base, a vertical feed mechanism mounted on an upper surface of said rotary table, a robot body vertically movably mounted on said vertical feed mechanism, a robot arm mounted on said robot body and being capable of laterally extending from and retracting into said robot body, a robot hand attached to a free end of said robot arm via a robot wrist, said robot hand operating to grip a longitudinally elongated bar-like work piece and to release the same, an improvement wherein said robot hand comprises:

a base member formed as a slide guide and having a flange portion for attaching said guide to said free end of said robot arm;

a pair of gripping members slidably attached to said slide guide for longitudinal movement thereon, each gripping member having transversely movable fingers enabling it to grip a bar-like work piece and to release the same;

means for sliding said pair of gripping members toward and away from one another in the longitudinal direction of said work piece thereby establishing an adjusted distance between said pair of gripping members, said flange portion being formed with a planar attaching surface which is perpendicular to the gripping movement of said gripping members, and means for fixing said pair of gripping members to said base member.

7. An industrial robot as set forth in claim 6, wherein said sliding means comprise a straight guide rail formed in said slide guide, said straight guide rail having a predetermined length, and a complementary guide groove formed in each of said pair of gripping members.

* * * * *